Patented Feb. 17, 1931

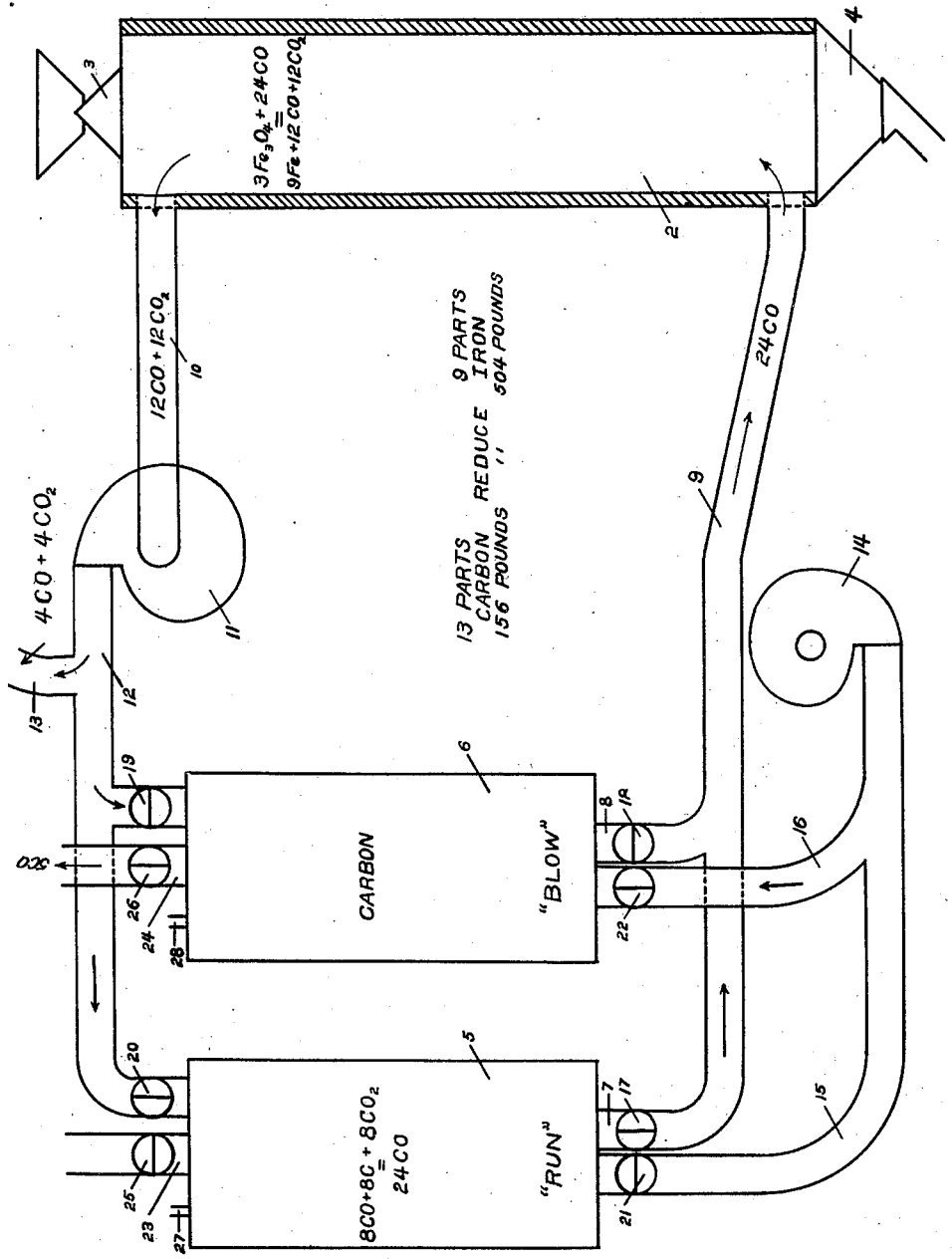

1,792,507

UNITED STATES PATENT OFFICE

WILLIAM W. PERCY, OF SEATTLE, WASHINGTON

PROCESS OF REDUCING THE IRON IN IRON OXIDES TO ITS METALLIC FORM

Application filed June 10, 1926. Serial No. 114,939.

My invention relates to the process of reducing the iron in iron oxides to its metallic form. More particularly, my invention relates to the process of reducing iron oxide by the use of gaseous reducing agents such as carbon monoxide and hydrogen.

So far as known, there is not any prior process in commercial use which constitutes an exact basis for comparison with the process which constitutes my invention in respect to the economy in the use of carbon. However, the advantages of my process over that which is commonly in use will appear from the following. Heretofore, in the commercial processes of reducing iron oxide it has been necessary to employ approximately one part by weight of carbon to one part by weight of iron, and it is well known to those skilled in the art that only about one-third of the carbon thus supplied to the blast furnace is actually utilized in reducing the iron oxide. What seems to transpire is that there are approximately two parts of carbon monoxide and one part of carbon dioxide produced in the reduction of the ore. Therefore, there are two parts approximately of carbon monoxide, (be it noted, the desired reducing gas), which escape along with the one part of carbon dioxide. It is well known that in the reduction of iron oxides by carbon monoxide as a reducing agent that the efficiency of the process depends entirely upon the equilibrium existing between the carbon dioxide on the one hand and the carbon monoxide on the other in the presence of iron oxide and iron. This equilibrium is approximately one part of carbon monoxide and one part of carbon dioxide.

In standard blast furnace practice, it is impossible to reach this one to one equilibrium due to the conditions within the blast furnace, and the ratio of the escaping gases is then approximately two parts of carbon monoxide and one part of carbon dioxide. A primary purpose of my invention is to increase the efficiency of the use of carbon monoxide in that I shall approach a true equilibrium between these escaping gases, or one part of carbon monoxide and one part of carbon dioxide, with a further saving of carbon by regeneration of the gases produced in the reducing chamber, which will result ultimately in my employing about one-third the amount of carbon used in the above blast furnace process.

In the process heretofore employed in the reduction of the iron oxide, the reducing gas is initially developed in the reducing chamber. A primary purpose of my invention is to provide for the development of the reducing gas external to the reducing chamber.

A further primary object of my invention is to provide a process for the reduction of iron oxide which employs a portion of the used reducing gas resulting from the reduction of iron oxides, together with a portion of the unused reducing gas originally supplied to the reducing chamber, by subjecting such portion to highly heated carbon, and reintroducing said gas in the form of a reducing gas to the reducing chamber.

While it has been well known that carbon monoxide is a very desirable reducing agent, the cost of monoxide, as produced in this process, free from diluting nitrogen, has been prohibitive, so far as applying the same commercially is concerned. A primary object of my invention is to provide a carbon monoxide reducing gas as a reducing gas for iron oxide which is free from the diluting effect of nitrogen.

Another primary object of my invention is to provide a process which may be commercially applied in which free hydrogen may be employed as a part of the reducing gas.

It is well known to those versed in the art that hydrogen gas acting on highly heated iron ores containing sulphur and phosphorus will desulphurize and dephosphorize said iron ores. Therefore it is a primary object of my invention to provide a process in which hydrogen gas may be commercially used to desulphurize and dephosphorize iron ores.

The above mentioned general objects of my invention, together with others inherent in the same, are attained by the process illustrated in the following drawing, the same being merely a preferred exemplary form of embodiment of my invention, throughout which drawing like reference numerals indicate like parts:

The figure is a diagrammatic view of one form of apparatus in which the process embodying my invention may be carried out.

A reducing chamber 2 is provided with means in the form of hopper 3 for the admission of pre-heated ore without the escape of the gases from the reducing chamber. Likewise, a hopper 4 is provided for the withdrawal of the iron in reduced form. Two gas generators 5 and 6, which may be of the well known water gas form, are provided external to the reducing chamber. Conduits 7 and 8 from each of said gas generators unite to form a gas main 9 which conducts the reducing gas from the said generators to the lower portion of the reducing chamber 2. A withdrawal conduit 10 leads off from the top of the reducing chamber 2 to an exhauster 11, which in turn is connected by conduit 12 to generator 6 and to generator 5. Conduit 12 has leading off therefrom an excess gas conduit 13, which may lead to a chamber (not shown) where the ore is preheated, the said excess gas being used as fuel therefor. An air blower 14 is connected by conduits 15 and 16 to generators 5 and 6, respectively. The said conduits have valves 17, 18, 19, 20, 21 and 22.

Generators 5 and 6 are further provided with stacks 23 and 24, respectively, having valves 25 and 26, which provide for the carrying off of the products of combustion developed during the period when the generators are being blown, or being raised to the desired temperature.

The mode of operation of the apparatus embodying my invention is as follows:

The pre-heated ore is admitted to the reducing chamber 2 through the hopper 3. Thereupon, valve 17 is opened and carbon monoxide is admitted to conduit 7, into gas main 9, and thence into the lower part of the reducing chamber 2, said gas coming from the generator 5. While generator 5 is being "run", or making reducing gas, generator 6 is being blown, i. e., the valves 18 and 19 are closed and valves 22 and 26 are opened and the air blower 14 blows a blast of air into generator 6, which is fired to heat the carbon placed therein, valve 26 being in open position, and thereby heat is stored in the generator. So soon as the generator 6 is brought to the desired temperature, valves 22 and 26 are closed, and the valves 18 and 19 are opened, and the next supply of gas to the reducing chamber is derived from generator 6, which passes down conduit 8 into gas main 9. In the meantime, the generator 5 will have become cooled below the point of efficiency, and thereupon valves 17 and 20 will be closed and valves 21 and 25 will be opened, and the air blast from the air blower will be directed to reheating the contents of generator 5.

In the reduction chamber 2 the carbon monoxide gas from the gas main 9 comes into contact with the pre-heated iron oxide with the result that the iron in the iron oxide is reduced to its metallic form. As a result of the reduction process, there is produced carbon dioxide gas. From the top of the reducing chamber there is withdrawn in conduit 10 carbon dioxide with an unused portion of the carbon monoxide. The gas thus withdrawn in conduit 10 passes through exhauster 11 and from exhauster 11 passes into conduit 12. Conduit 13 serves to withdraw a portion of the gas which may be used as a fuel for pre-heating the ore. The remainder of the gas is conducted to the particular generator which is being "run" or making gas, where it is subjected to highly heated carbon, where the carbon dioxide is reduced to carbon monoxide and again supplied through conduit 7 to the gas main 9, and therefrom to the bottom portion of the reducing chamber.

As the iron is reduced, it is drawn off through hopper means 4.

The above description for purposes of clearness has been taken in steps. However, it will be understood that the process is continuous in operation. The pre-heated ore is supplied to the reducing chamber 2 as rapidly as the ore is withdrawn at the bottom, and having a plurality of generators it is manifest that a continuous supply of reducing gas is entering the reducing chamber through conduit 9.

Next will be considered quantitatively the operation of the reduction process embodying my invention. For purposes of illustration therein, the particular iron oxide used will be magnetite, having the chemical formula $Fe_3O_4$. The reduction process is assumed to take place according to the equation

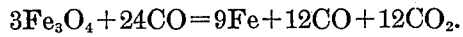

$$3Fe_3O_4 + 24CO = 9Fe + 12CO + 12CO_2.$$

According to this reaction therefore, of the twenty-four parts of carbon monoxide which are received into the reducing chamber, twelve parts absorb oxygen from the iron oxide and become twelve parts carbon dioxide. The remainder, namely, twelve parts of carbon monoxide, passes off unused with the twelve parts of carbon dioxide in the withdrawal conduit 10. Approximately one-third of the withdrawn gas, or four parts of carbon monoxide and four parts of carbon dioxide, are withdrawn through the conduit 13, thus leaving eight parts of carbon monoxide and eight parts of carbon dioxide, which are conducted to the generator 5, (the same being the particular generator on the "run"). In the said generator, the eight parts of carbon dioxide combine with eight parts of highly heated carbon, thus forming sixteen parts of carbon monoxide, which, together with the eight parts of carbon monoxide unacted upon, now provides twenty-four parts of carbon monoxide to be reintroduced to the reducing chamber 2.

It is thus manifest that it was unnecessary to act upon one-half of the returned gas, i. e., eight parts of carbon monoxide. Of the eight parts monoxide gas and eight parts dioxide entering the generator, eight parts existing as monoxide need no reaction, as they already exist as reducing gas. Eight parts of dioxide require eight parts of highly heated carbon to produce sixteen parts monoxide gas, which, together with the eight parts previously mentioned, makes a total of twenty-four parts of monoxide gas, which is the original amount of gas entering the reducing chamber 2. In the usual process, these twenty-four parts of monoxide gas would require twenty-four parts of carbon to produce, whereas there are only required eight parts of carbon in the process embodying my invention.

To the eight parts of carbon necessary in the reaction must be added, however, the quantity of carbon necessary to impart to the eight parts of carbon its highly heated condition. The quantity of carbon normally required to do this will be approximately five parts of carbon, which pass over in the form of five parts of carbon dioxide in the stack 24. It will be understood that the heat required to provide the eight parts of highly heated carbon is developed and stored during the time when the generator is being blown.

To summarize, therefore, it is manifest that there are required eight parts of carbon in the generator 5 for the reaction plus five parts of carbon for the heat of reaction, making a total of thirteen parts of carbon to provide twenty-four parts of carbon monoxide, which in turn reduces from its oxide nine parts of iron. Multiplying the thirteen parts of carbon by twelve gives one hundred and fifty-six pounds of carbon required in my process to reduce nine times fifty-six ($9 \times 56$) or five hundred and four pounds of iron, or a ratio of one ton of iron requiring six hundred and nineteen pounds of carbon. Hence the economy and efficiency of my process is most manifest when by the regeneration of the used gases the ratio of carbon to reduced iron in my process is approximately one to three, while in other processes not depending upon the regeneration of used gases the ratio is approximately one to one.

A further manifest advantage of this process is the providing of carbon monoxide free from the diluting effect of nitrogen, which makes the action of the monoxide gas much more efficient, this being the only process known in which this condition has been approached.

Through inlet pipes 27 and 28, highly heated steam may be admitted to the generators 5 and 6. This steam coming in contact with the highly heated carbon will result in the carbon combining with the oxygen of the steam to form carbon monoxide, thereby liberating free hydrogen as a part of the reducing agent. This enters the reducing chamber along with the monoxide, and the following reaction is assumed to occur:

$$24H_2 + 3Fe_3O_4 = 9Fe + 12H_2O + 12H_2.$$

The twelve parts of free hydrogen and the twelve parts of water vapor in the form of steam are in the same equilibrium as obtains between the twelve parts of carbon dioxide and the twelve parts of carbon monoxide. The twelve parts of free hydrogen and the twelve parts of water vapor in the withdrawn gas follow the same general course as that already described for the carbon monoxide.

Therefore, it is manifest in the process embodying my invention that the great advantage of free hydrogen as a reducing agent is employed and made available commercially. Moreover, it will be readily recognized that the process embodying my invention in which free hydrogen is thus liberated provides a reducing agent to operate as a desulphurizing and a dephosphorizing agent. The carbon for the regenerator may be supplied from any suitable source such as coke, charcoal, coal, oil or gas. When hydrocarbon fuels are used as the source of the carbon, it also develops that in the cracking of the hydrocarbons there is liberated free hydrogen which adds to the hydrogen content of the reducing gas. This hydrogen in the reducing chamber will form steam which is regenerated, and therefore may be considered the same as though steam had been admitted through inlet pipes 27 and 28.

Herein the terms "generator" and "regenerator" are used synonymously.

Moreover, instead of withdrawing a portion of the gases through conduit 13, it is manifest that all the gases from the reducing chamber may be subjected to the highly heated carbon in the regenerator and reduced to carbon monoxide and the desired portion of the same be thereafter withdrawn from the circuit.

I claim:—

1. In a process for manufacturing iron from iron oxide ores, consisting in charging preheated ore into a reducing chamber, subjecting the ore to the reducing influence of reducing gases consisting of a mixture of carbon monoxide and free hydrogen, the withdrawal of the gases from said reducing chamber after reacting with the ore, the withdrawal of a portion of the withdrawn gases, the maintaining of gas temperatures of the remaining portion of said gases and causing the same to pass downwardly through a bed of incandescent carbon of a hydrocarbon fuel in a bottom-blown gas regenerator exterior to the reducing chamber, and returning of the gases in a regenerated state from said regenerator into the bottom of the reduction zone in said chamber at a temperature at which complete reduction of the iron oxide will take place.

2. In a process for manufacturing iron from iron oxide ores, by charging preheated ore into a reducing chamber and the removal from the ore of the oxygen and the sulphur and the phosphorus by subjecting the downwardly moving column of ore to the action of reducing gas comprising a mixture of carbon monoxide and free hydrogen, withdrawing the gas from the reducing chamber, the removal of a portion of the said withdrawn gas, maintaining the temperature of the remainder of the gas and passing the same downwardly through a bed of incandescent carbon of a hydrocarbon fuel in bottom-blown gas regenerators located exterior to said reducing chamber and returning the regenerated gas to the reducing chamber to react on the iron oxide, the iron sulphide and the phosphoric acid contained in the ore.

3. In a process for manufacturing sponge iron from its oxide ores by subjecting in a reducing chamber a downwardly moving column of preheated ore to the reducing action of carbon monoxide and free hydrogen, the withdrawal of the gases from the reducing chamber and removing a portion of such withdrawn gases, the regenerating of the remainder of the withdrawn gases by passing the same downwardly through one of a series of gas regenerators located exteriorly to the reducing chamber and containing hydro-carbon fuel returning the regenerated gases to the reducing chamber, and the blowing of a blast of air upwardly through the regenerator under pressure to effect the complete combustion of the lower layer of the fuel in the regenerator being blown.

4. In a process for manufacturing iron from its iron oxide by subjecting a downwardly moving column of preheated ore in a reducing chamber to an upwardly moving stream of carbon monoxide and free hydrogen, the withdrawal of the gases at the top of the reducing chambers, the removal of a portion of the withdrawn gases, passing the remaining of the withdrawn gases downwardly through a bed of incandescent carbon in any one of a series of gas regenerators and returning the regenerated gases into the bottom of the reducing chamber, the blowing of a gas regenerator not in use by passing a forced draft of air upwardly through a bed of hydro-carbon fuel therein in maintaining complete combustion of the lower layer of the fuel in the regenerators, and distilling and cracking of the volatile portion of the fuel by the contacting of the volatile constituents of the same and the highly heated carbon in the lower layer of the regenerator.

5. The process for manufacturing iron from its iron oxide by subjecting preheated ore in a reducing chamber to the effect of a stream of carbon monoxide and free hydrogen which consists in drawing the gases from the reducing chambers, removing a portion of the withdrawn gases, passing the remainder of the withdrawn gases downwardly through a bed of incandescent carbon in any one of a series of hydro-carbon fueled bottom-blown gas generators and returning the regenerated gases into the reducing chamber, said incandescent carbon constituting the lower layer of said hydro-carbon fuel such that the downward travel of the gases through the regenerating chamber cracks the volatile portion of the fuel by the contacting of the volatile constituents thereof with said highly heated lower layer of incandescent carbon.

6. The process for manufacturing iron from its iron oxide by subjecting preheated ore in a reducing chamber to the effect of a stream of carbon monoxide and free hydrogen which consists in withdrawing the gases from the reducing chambers, passing the withdrawn gases downwardly through a bed of hydro-carbon fuel in any one of a series of bottom-blown gas regenerators and returning the regenerated gases into the reducing chamber, said downward travel of the gases through the regenerator chamber cracking the volatile portion constituting the upper layers of the fuel by the contacting of the volatile constituents thereof with a lower layer of incandescent carbon.

In witness whereof, I hereunto subscribe my name this 2d day of June 1926.

WILLIAM W. PERCY.